May 19, 1959 P. C. HOSKING 2,887,545
VIBRATORY UNBALANCE DETERMINING APPARATUS
Filed Nov. 21, 1956 2 Sheets-Sheet 1
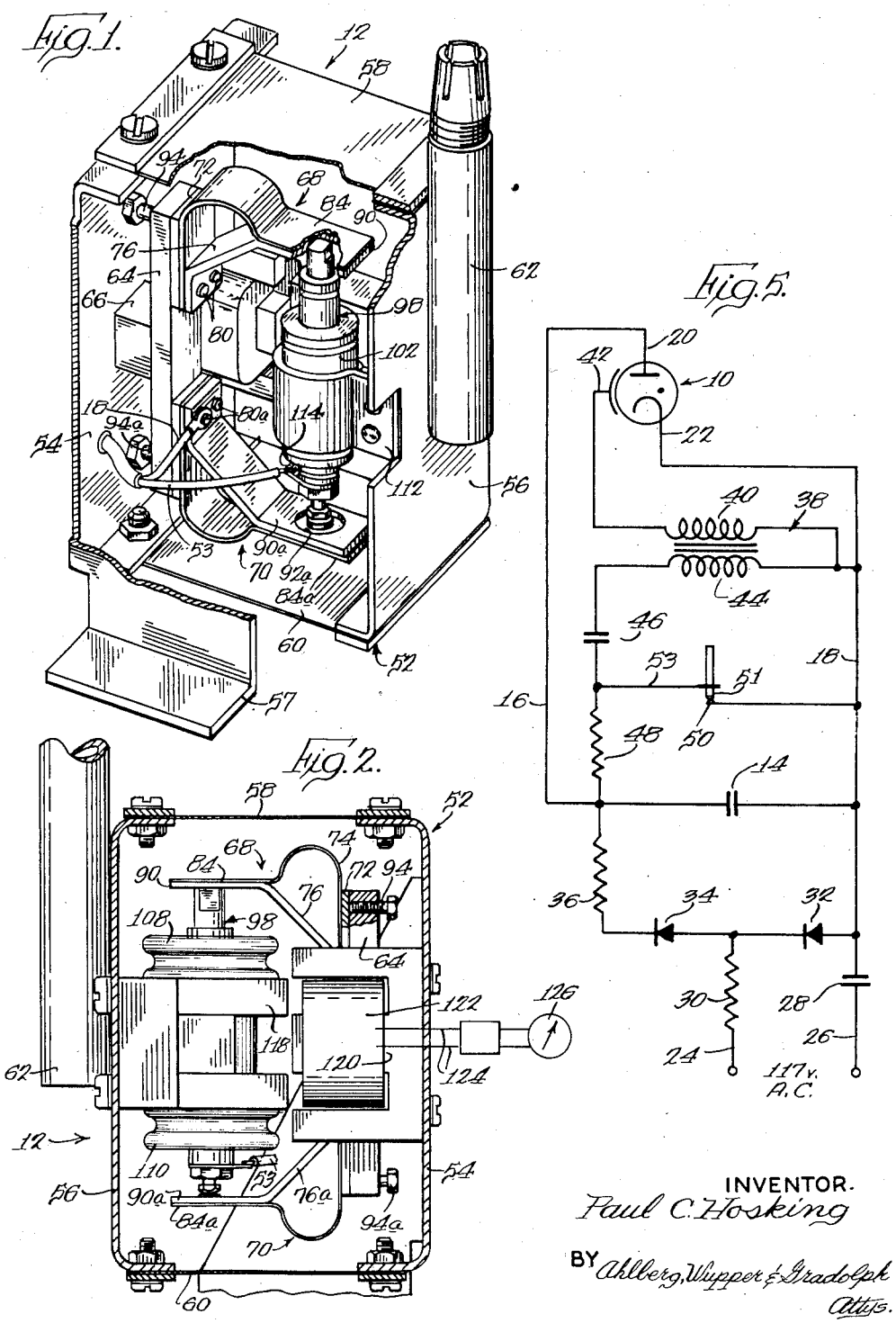
INVENTOR.
Paul C. Hosking
BY Ahlberg, Wupper & Gradolph
Attys.

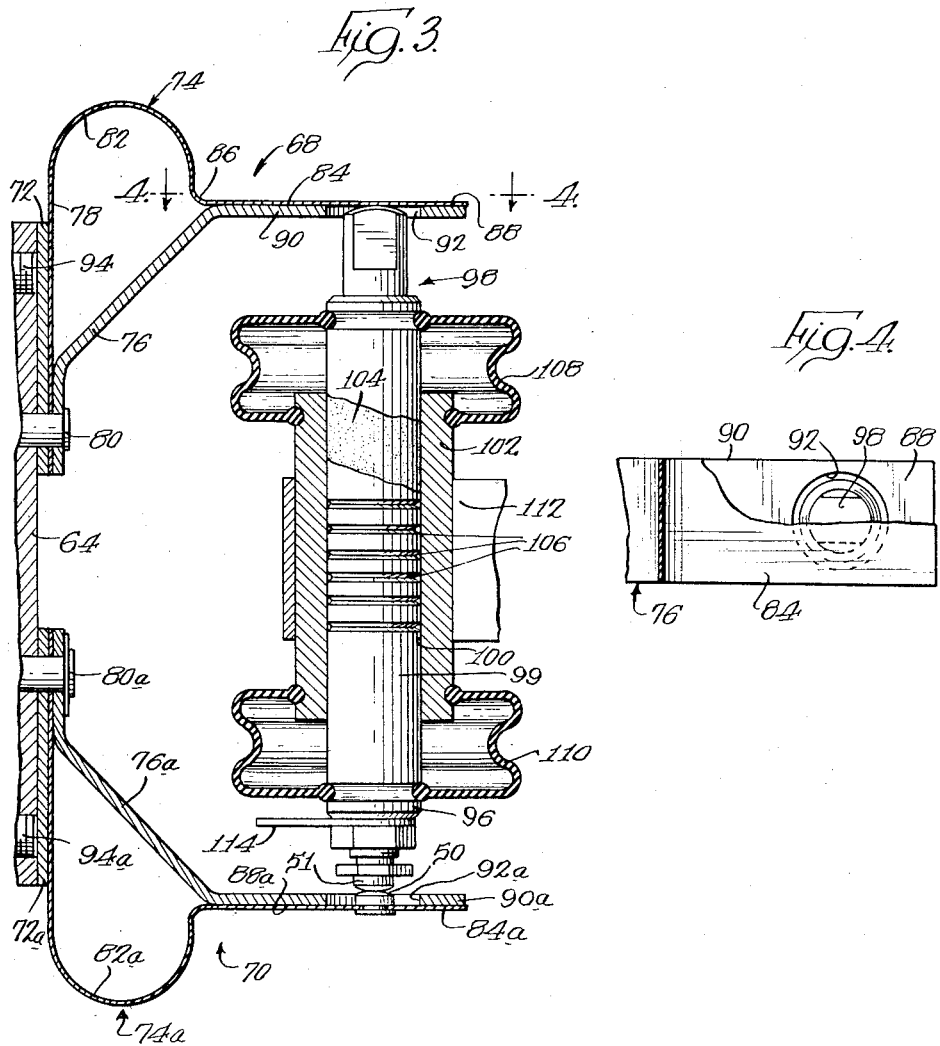

United States Patent Office 2,887,545
Patented May 19, 1959

2,887,545

VIBRATORY UNBALANCE DETERMINING APPARATUS

Paul C. Hosking, Wilmette, Ill., assignor to Stewart-Warner Corporation, Chicago, Ill., a corporation of Virginia Application November 21, 1956, Serial No. 623,650

6 Claims. (Cl. 200—61.48)

The present invention relates to apparatus for determining unbalance in a moving part as manifested by vibrations induced by unbalanced mass in the part.

One object of the invention is to provide improved apparatus of the above character in which the mechanical actuation of electrical contact means is utilized in an improved structural assembly to produce a superior synchronization between the operation of a stroboscopic unbalance locator and the instantaneous vibratory movement of an unbalanced part.

Another object is to provide highly simplified, economical apparatus which has an extremely reliable mode of operation in accurately synchronizing a stroboscopic unbalance locator with the vibrational operation of electrical contact means.

Other objects and advantages will become apparent from the following description of the exemplary form of the invention illustrated in the drawings, in which:

Figure 1 is a partially sectioned perspective view of an electrical pickup unit constructed in accordance with the invention and shown with dust sealing boots removed for clearness in illustration;

Fig. 2 is a partially sectioned, rear elevation of the pickup unit shown in Fig. 1;

Fig. 3 is a fragmentary, front elevational view showing vital components of the unit on a larger scale;

Fig. 4 is an enlarged fragmentary view taken along the line 4—4 of Fig. 3 and showing certain parts broken away for clearness; and Fig. 5 is a diagrammatic illustration of the unbalance locating means provided by the invention and incorporating the pickup unit of Figs. 1 to 4.

The improved unbalance determining apparatus provided by the invention is particularly well suited for checking for unbalance in a vehicle support wheel (not shown) while the wheel is mounted on and temporarily suspended by its coacting vehicle axle structure (not shown). Means suitable for supporting a vehicle axle and rotating a support wheel on the axle for the purpose of determining unbalance in the wheel are well known in the art and need not be specifically disclosed in the present application. See, for example, the United States patent to Merrill, et al. No. 2,383,405, issued August 21, 1945.

It will be understood that unbalanced mass in a vehicle support wheel is manifested upon rotation of the wheel by mechanical vibrations of the wheel and its journal structure. The circumferential location of the unbalanced mass is determined by a stroboscopic lamp 10, Fig. 5, which is employed to view the rotary position of a rotating vehicle support wheel (not shown) as the wheel moves across the center of a vibratory cycle of movement while vibrating in a condition of resonance.

As controlled by improved structure provided by the present invention, stroboscopic operation of the lamp 10 is precisely phased with the successive instantaneous movements of the rotating wheel through the exact center of its path of vibratory movement. This is accomplished by means of an improved vibratory pickup unit 12, Figs. 1 to 4, which operates the lamp 10 through a highly simplified electrical circuit shown in Fig. 5.

To sense vibratory movement of the wheel being checked, the pickup unit 12 is suitably connected, as will be presently explained in greater detail, with the wheel support structure as taught generally by the United States Patent No. 2,656,713 issued November 27, 1953, to Arthur C. Allen.

As shown in Fig. 5, the simplified circuit used to operate the tube 10, a conventional strobotron, in synchronization with the vibratory movement of a rotating wheel comprises a power storing capacitor 14 having opposite sides connected by leads 16, 18 to the positive and negative power terminals 20, 22 of the tube. The capacitance of the capacitor 14 is sufficient to provide an adequate power supply to the tube 10 for momentary operation.

The capacitor 14 is connected continuously with a power supply circuit including two input leads 24, 26 adapted for connection with an ordinary power outlet supplying current at approximately 117 volts. The line 26 is connected through a capacitor 28 to the lead 18. The other input lead 24 is connected through a low value resistor 30 to a center tap between two rectifiers 32, 34, which are connected in series to form a voltage doubling rectifying connection between the lead 18 and a resistor 36 connected to the lead 16.

The voltage doubling circuit thus formed charges the power accumulating capacitor 14 to a voltage value sufficient for operating the strobotron 10.

Flashing or momentary operation of the strobotron 10 is controlled by a pulse transformer 38 having a secondary winding 40 connected between a control terminal 42 on the tube and the lead 18. The primary winding 44 of the transformer 38 is also connected at one end to the lead 18. The other end of the primary winding 44 is connected through a pulse feed capacitor 46 and a very high valued resistor 48 with the lead 16 which is energized through the low value resistor 36. Thus the pulse feed capacitor 46 is charged from the power circuit by current flowing through the high value resistor 48 and the transformer primary 44.

Two stroboscopic contacts 50, 51 are connected respectively to the line 18 and to a conductor 53 leading to a center tap between the capacitor 46 and the resistor 48. Closing of the contacts 50, 51 discharges the pulse feed capacitor 46 through the transformer primary 44 to induce in the transformer secondary 40 a voltage which, as applied to the tube control terminal 42, is sufficient to effect momentary firing of the tube by a discharge of current from the power capacitor 14. The impedance of the control circuitry employed to impress a firing voltage on the tube control terminal 42 is such that the time lag between closing of the contacts 50, 51 and firing of the tube is inconsequential. This makes for extremely precise phasing between electrical operation of the tube 10 and the vibration of rotating wheel, as will be discussed presently in greater detail.

Due to the high resistance value of the resistor 48, the current passing through this resistor between the leads 16 and 18 upon closing of the contacts 50, 51 is held to a value sufficiently low to avoid any substantial diversion of the power supply stored in the capacitor 14 for operation of the strobotron 10.

The contacts 50, 51 are incorporated into the pickup unit 12, Figs. 1 to 4, which comprises a parallelogram case 52. The case 52 includes a stationary side member 54 having a support bracket 57 adapted to connect with any suitable support structure of a generally rigid character. A second side member 56 of the case 52 is movably supported in spaced parallel relation to the side member 54 by two flexible end members 58, 60 of similar shape and size formed of spring metal and connected between the side members at opposite ends of the case.

The flexibility of the end members 58, 60 permits cyclic movement of the side member 56 longitudinally with respect to the stationary side member 54 while the similar dimensions of the end members maintain a parallel relationship between the two side members 54, 56.

A connecting bracket 62 attached longitudinally to the movable side member 56 is used in connecting this side member to the journal structure of a suspended vehicle wheel. The details of this connection need not be described here as the connection is made by attaching the bracket 62 to connecting structure such as that shown in the previously mentioned Allen Patent, No. 2,656,713, in which the tubular element 136 of the patent compares generally with the bracket 62 of the present application.

The stationary side member 54 is used as a support for an elongated, rectilinear base 64, Figs. 1 to 3, disposed in the case 52 in perpendicular relation to the flexible end members 58, 60. Formed of an electrical insulating material, such as a fiber reinforced plastic, the base 64 is mounted in spaced parallel relation to the side member 54 by a sturdy spaced block 66 anchored between the side member 54 and an adjacent medial portion of the base.

Opposite ends of the base 64 provide support to a pair of opposed phasing assemblies 68, 70 mounted on the side of the base opposite the side member 54 and forming mirror images of each other, except for specific features of one assembly 70 which will be described in detail presently.

The phasing assembly 68 mounted on the upper end of the base 64, as this part is oriented in Figs. 1 to 3, comprises a flexible cantilever base blade 72, a cantilever leaf spring 74, and a cantilever bracket 76 extending upwardly from lower ends having a common terminus along a medial portion of the base. The base blade 72 is superimposed directly on the base 64 to extend to the upper end of the base, as shown. The base blade end of the spring 74 is shaped into a straight shank section 78, which continues to the lower end of the spring where it is sandwiched between the lower end of the bracket 76 and the lower end of the base blade 72. The lower ends of the bracket 76, the spring 74, and the blade 72 are all pierced and anchored to the base 64 by a pair of rivets 80.

The upper end of the spring shank or segment 78 continues a short distance above the upper end of the blade 72 and merges with a medial segment 82 of the spring, which is shaped into a semicircular curve concave toward the companion phasing assembly 70. At the end 86 of the curved segment 82 remote from the shank segment 78, the spring 74 is turned sharply away from the shank segment 78 and shaped to form a substantially straight contact section or segment 84 continuing to the extreme cantilevering end of the spring.

The unstressed shape of the spring 74 tends to swing the spring contact segment 84 toward the companion phasing assembly 70 to make an acute angle with the base 64.

However, movement of the spring contact segment 84 toward the companion phasing assembly 70 is limited by its engagement, Figs. 3 and 4, with a flat abutment surface 88 formed on the free end 90 of the cantilever bracket 76 and facing away from the balancing assembly 70 at a right angle to the base 64. As shown, the shank segment 78, the curved segment 82, and the contact segment 84 of the spring 74, each has a length approximating one-third the length of the spring. The projecting bracket end 90, which defines the abutment surface 88, is approximately equal in length and width to the spring contact segment 84.

A portion of the surface of the spring contact section 84 facing the companion phasing assembly 70 is exposed toward the latter assembly by an aperture 92 formed in the projecting bracket end 90.

Since the structure of the phasing assembly 70 is fashioned and arranged basically as a mirror image of its companion phasing assembly 68 just described, structural components of the two assemblies are designated with the same reference numerals, with the addition of the subscript "a" to the numerals applied to the assembly 70. Hence the description of the assembly 68 can be applied to the assembly 70, except for particular features of the latter, which will be described specifically.

It will be noted with reference to Fig. 3 in particular, that the portion of the spring contact section 84a which is exposed toward the phasing assembly 68 through the bracket opening 92a is used as a base of attachment for the contact 50, Figs. 3 and 5, previously mentioned in connection with control of the strobotron 10. The contact 50 is mounted on the spring section 84a to protrude into the opening 92a and for convenience in description can be considered as a part of the spring 74a.

The force with which the spring 74 of the phasing assembly 68 urges the spring contact segment 84 against the abutment surface 88 surrounding the bracket aperture 92 is adjusted by means of a setscrew 94 threaded through the upper end of the insulator base 64, Figs. 1 and 3, to engage the cantilevering end of the base blade 72, Figs. 1 to 3. Thus positioned, the screw 94 is effective for swinging the cantilevering end of the base blade 72 and the adjacent end of the spring shank 78 away from the base 64 to increase the stress in the spring 74 which urges the spring contact section 84 against the abutment surface 88. Similarly, an adjusting screw 94a threaded through the lower end of the base 64, Figs. 1 to 3, engages the cantilevering end of the blade 72a to adjust the force of engagement of the spring contact section 84a with the abutment surface 88a.

It is noteworthy that adjustments of the phasing assemblies 68, 70, which vary the force of engagement of the respective spring contact sections 84, 84a with the coacting abutment surfaces 88, 88a, do not vary or disturb the spacing between the contact 50 of the spring 74a and the opposed portion of the spring contact section 84 exposed through the bracket opening 92. This spacing between opposed portions of the spring sections 84, 84a, exposed through the bracket openings 92, 92a, is determined independently of the above described adjustments of the phasing assemblies by the unvarying spacing between the parallel bracket abutment surfaces 88, 88a, which respectively encircle the bracket openings 92, 92a.

The previously mentioned contact 51, which opposes the contact 50, is formed by the projecting end of a short stem (denoted by the same reference numeral 51) threaded into one end of an elongated plunger body 96. The contact stem 51 together with the plunger body 96 forms an elongated plunger 98 extending between the contact 50 and the opposing portion of the spring contact segment 84 exposed through the bracket opening 92. The overall length of the plunger 98 is adjusted, by adjusting the threaded contact stem 51 in the plunger body 96, so that opposite ends of the plunger make simultaneous engagement with the contact 50 and the opposing portion of the spring segment 84 while both spring segments 84, 84a are in engagement with the respective abutment surfaces 88, 88a.

The plunger body 96 is shaped externally, Fig. 3, to form an outer cylindrical surface 99 extending the major portion of the length of the plunger. This surface 99 is closely encircled by an inner cylindrical surface 100, Fig. 3, formed in a plunger actuating sleeve 102 somewhat shorter than the plunger surface 99.

The cylindrical sleeve surface 100 is slightly larger in diameter than the cylindrical plunger surface 99, thus providing between the two surfaces a radial clearance just sufficient to accommodate a thin force transmitting oil film 104. The clearance between the plunger surface 99 and the sleeve surface 102 can be of the order of one to two ten-thousandths of an inch. The oil film 104 is formed by a viscous fluid, such as that used in shock absorbers. Petroleum oils with a high viscosity, for example 2300 sec. Saybolt at 100° F., with a high viscosity index, for example 100 V.I., are satisfactory for this purpose.

A reserve supply of the fluid used in forming the film 104 is contained in a plurality of axially spaced circumferential grooves 106 cut into the plunger body 96 within the length of the sleeve.

Opposite ends of the plunger surface 99 project beyond the sleeve 102. These projecting ends of the plunger surface are protected from dust by a pair of axially flexible, annular boots 108, 110 extending between the respective ends of the sleeve 102 and the adjacent ends of the plunger surface.

The sleeve 102 is firmly attached to the side member 56 of the case 52 by means of a bracket 112 on the side member which securely embraces the medial portion of the sleeve.

Thus supported, the sleeve 102 and hence the plunger 98 are constrained by the previously mentioned flexible end members 58, 60 against movement out of parallel relation to the base 64, which is parallel to the side member 54. Hence, the axis of the plunger 98 is always perpendicular to the parallel abutment surfaces 88, 88a which limit movement of the two cantilever springs 74, 74a.

As shown in Fig. 1, the conductor wire 53 and a branch conductor wire forming a part of the lead 18 (referred to in the description of the stroboscope operating circuit illustrated in Fig. 5) are brought in through the case side wall 54 and connected electrically with the respective contacts 51, 50. The conductor 18 connects through one of the rivets 80a and the base of the bracket 76a with the base of the spring 74a, which completes an electrical connection from the wire 18 to the contact 50. The conductor 53 connects to a terminal 114, Figs. 1 and 3, on the contact end of the plunger 98, which completes an electrical connection between the conductor 53 and the contact 51.

In operation, the sleeve 102 is reciprocated by wheel vibration transmitted to the sleeve through its support structure connected with the actuating bracket 62. The reciprocating frequency of the sleeve 102 is equal to the rather high rotary speed of the wheel being checked for unbalance.

The viscous friction of the oil film 104 between the plunger surface 99 and the sleeve surface 100 will cause the plunger 98 to follow each rapid movement of the sleeve 102 with little or no slippage. The vehicle wheels are usually rotated at approximately 800 r.p.m. during the unbalance detection operation. Therefore, the frequency of oscillation of the vibratory pickup unit 12 will be of the order of 800 cycles per minute. At this frequency, there is little or no slippage between the sleeve 102 and plunger 98 due to the motion of the sleeve. The resisting forces of the springs 84 and 84a will cause little, if any, slippage at this frequency.

Assume for purposes of description that a slight amount of slippage is caused by each of the springs 84 and 84a. As the plunger 98 moves upwardly with respect to Fig. 3 against the resisting forces of spring 84, the slippage results in the plunger 98 slightly lagging the sleeve 102. When the sleeve 102 reaches the upper limit of its cycle of movement and begins downwardly, the lag of the plunger 98 now becomes a lead. When the sleeve 102 passes the center of its reciprocating cycle and moves into the lower half of its cycle of movement, the plunger 98 moves into engagement with the spring 84a. The spring 84a resists the movement of the plunger 98 to the same extent as the spring 84. Therefore, the lead of the sleeve 102 is canceled by the resistive force of the spring 84a acting on the plunger.

Thus, it can be seen that, even if the springs 84 and 84a cause a slight amount of slippage between the plunger and sleeve, this slippage is not cumulative. Instead, it builds up and is then canceled all within the same cycle of movement of the sleeve.

Any out of phase relationship between the sleeve 102 and the plunger 98 that exists at the position in which contacts 50 and 51 engage will always be the same for a given pickup unit. It is compensated for by adjusting the contact 51 with respect to the contact 50. Hence, any out of phase relationship between the plunger 98 and the sleeve 102 caused by springs 84 and 84a is compensated by adjustment of the contact 51. In actual tests with a known locus of unbalance in a wheel being tested, the entire amount of out of phase relationship between the deflection caused by the unbalance and the flashing of the stroboscopic lamp 10 has been easily held to less than 5 degrees.

Similarly any slippage due to the motion of sleeve 102 is not cumulative; and, therefore, is compensated for by adjustment of the contact 51.

It is well known, however, that a constant or very low frequency force, for example, less than three cycles per second, applied to the plunger 98 or to the sleeve 102 will cause relative movement therebetween. Hence, if the sleeve is moved slowly to a lower position than that shown in Fig. 2, the force of spring 84a acting on the plunger will cause slippage between the plunger and sleeve. If the movement of the sleeve is slow enough, no perceptible movement of the plunger will occur. If the movement of the sleeve is rapid enough, the plunger will move a fraction or all of the distance covered by sleeve movement. However, the plunger is moving against the biasing force of the spring 84a. If the sleeve remains in its displaced position, the spring will gradually overcome the viscous friction of the oil film 104; and the plunger will be returned gradually to its centered position.

This feature assures automatic and accurate phasing of the contacts 50, 51 relative to the wheel deflection caused by unbalance even if the axis of the wheel shifts after the pickup unit 12 is adjusted. This will be better appreciated with reference to the relationship of the pickup unit 12 with the vehicle suspension system. It will be remembered that the bracket 57 of the assembly 12 is rigidly supported above the ground or floor on which the balancing operation is performed. Therefore, the side member 54 is held rigidly in an elevated position.

It has also been stated earlier that the bracket 62 is connected firmly with the journal structure of the suspended vehicle wheel. The arm 62 is adjustable in length. This is usually achieved by providing a second arm (not shown) carried in telescoping relationship by the arm 62. The arms are adjusted such that the springs 58 and 60 are disposed horizontally as shown in Fig. 2 with the arms connected to the journal.

With the springs 58 and 60 in the position shown in Fig. 2, the springs 84 and 84a act on the plunger 98 to center it therebetween.

Let us assume now that, after the pickup has been set up and adjusted for balancing the wheel, the journal shifts and settles downwardly one-fourth inch. Inasmuch as the sleeve 102 is connected with the arm 62, it will be displaced downwardly one-fourth inch, pulling the plunger 98 with it if the movement is rapid. Gradually, however, the spring 84a urges the plunger 98 upwardly to its centered position shown in Fig. 2.

Thus, it can be seen that any shift in the arm 62 will be compensated for by the floating plunger and opposed spring construction.

This settling of the journal may occur during balancing with the wheels spinning. However, within the time interval of a few cycles of rotation, the plunger 98 will be properly centered in a manner similar to that described above. For example, if, during balancing the journal settles one-fourth inch downwardly, the center of the cyclical movement of the arm 62 and the sleeve 102 will be one-fourth below the position shown in Fig. 2. As a result, the plunger 98 will cause downward deflection of the spring 84a, throughout all or most of the rotational cycle depending upon the amount of deflection caused by unbalance. Hence, the spring 84a will apply a continuous or nearly continuous force to the plunger 98 until the plunger is urged to its centered position between springs 84 and 84a.

Without attempting an exhaustive theoretical explanation of the action of the stroboscopic control apparatus thus provided, it is noteworthy that the effect which the inertia of the plunger 98 has in resisting movement of the plunger longitudinally by the fluid film 104 to follow movement of the sleeve 102 in one direction is offset by the same tendency which this inertia has in resisting displacement of the plunger by the fluid film to follow movement of the sleeve in the opposite direction.

Assume for purposes of discussion that the inertia of the plunger 98 will cause a slight phasing displacement between the plunger and the sleeve 102. Thus, when the sleeve reaches the upper end of its travel and starts to move downwardly, the inertia of the plunger 98 will cause the plunger to lag to movement of the sleeve 102 downwardly. When the sleeve 102 reaches the extreme lower position of its cyclical travel and reverses direction to move upwardly, the lag which has already been introduced into the plunger 98 is canceled by the inertia of the plunger causing an equal phase displacement in the opposite direction.

Hence, although there may be some slight phase displacement during a portion of one complete cycle, nevertheless, this displacement is canceled rather than being cumulative. Again, as in the case of the resistive forces of the springs 84 and 84a described above, the fixed displacement error, which may exist as the contacts 50 and 51 close, may be compensated for by adjusting the contact 51. In this regard it will be appreciated that it is the net resultant fixed phase displacement error of both the pickup unit 12 and the stroboscope circuitry which is compensated for by the adjustment of the contact 51 in one operation rather than individual adjustments being made for each fixed error.

The similar strength characteristics of the companion springs 74, 74a, together with proper preadjustment of the phasing assemblies 68, 70 in the manner described, balance out the tendency of the two phasing assemblies to displace the plunger 98 longitudinally in the sleeve 102, when the center of its vibrational cycle of movement coincides with its centered position between the bracket surfaces 88, 88a. In the event of a longitudinal displacement of the sleeve 102 tending to displace the center of vibrational movement of the sleeve 102 along the axis of the plunger 98 so that the degree and time of displacement of the plunger 98 from one side of its centered position between the abutment surfaces 88, 88a would exceed the degree and time of its displacement to the other side of its centered position between the abutment surfaces 88, 88a, the phasing assemblies 68, 70 are automatically thrown out of balance and operate immediately to displace the plunger 98 against the resistance of the fluid film 104 as necessary to maintain an exact coincidence between the center of the vibrational movement of the plunger and a centered position of the plunger with respect to the abutment surfaces 88, 88a. The result is to assure automatically at all times that closing of the contacts 50, 51 coincides precisely with movement of the sleeve 102 through the exact center of its vibratory cycle.

Closing of the contacts 50, 51 fires the strobotron 10 in accurately phased relation to movement of the sleeve 102 and its actuating structure through the precise center of its vibratory cycle of movement.

The case 52 is also used to support and operate electrical means for sensing the intensity of the mechanical vibrations transmitted to the side member 56. As shown, the sensing means comprises a U-shaped permanent magnet 118 attached to the side member 56 and facing toward the projecting ends of an E-shaped magnetic core 120 secured to the side member 54. Cyclic movement of the magnet 118 relative to the closely adjacent core 120 induces a voltage or current in a coil 122 encircling the central leg of the core. The coil 122 is connected through leads 124 to suitable instruments 126, including an ammeter or voltmeter, which indicates the electrical reaction of the coil as a measure of the intensity of the mechanical vibrations applied through the side member 56 to the magnet 118. Readings of the instrumentation 126 are used in determining the size of the unbalance correcting weights needed.

While I have shown a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A stroboscopic vibratory pickup unit comprising, in combination, support means including two spaced abutment members defining two flat substantially parallel abutment surfaces facing away from each other, each of said abutment members being apertured to define an opening extending through the abutment surface thereof in opposed alignment with a similar opening in the other abutment member, two leaf springs supported respectively at one end on said support means and biased toward flat surface contact with said respective abutment surfaces in covering relation to said openings therethrough, one of said springs including on the free end thereof an electrical contact facing toward the free end of the other spring through the opening in the adjacent abutment member, an elongated plunger having opposite ends alined with said openings in said respective abutment members and including on one end thereof an electrical contact opposing said spring contact, said plunger being dimensioned longitudinally to effect simultaneous engagement of opposite ends thereof with the free ends of said respective springs when the latter are in simultaneous engagement with said respective abutment surfaces, said plunger defining an outer cylindrical surface thereon, a coupling sleeve defining an inner cylindrical surface encircling said outer cylindrical plunger surface in closely spaced relation thereto, a viscous fluid disposed between said plunger surface and said sleeve surface to yieldably resist relative longitudinal movement therebetween, and transmission means connected with said sleeve to impart cyclic longitudinal movement thereto.

2. For stroboscopically sensing unbalance induced vibratory movement, an electrical pickup unit comprising, in combination, an elongated plunger defining an outer cylindrical surface thereon, a coupling sleeve defining an inner cylindrical surface encircling said cylindrical plunger surface in closely spaced relation thereto, a viscous fluid disposed between said plunger surface and said sleeve surface to yieldably resist longitudinal displacement of said plunger relative to said sleeve, one end of said plunger forming an electrical contact, a support, two leaf springs carried in spaced relation by the support and engaging opposite ends of said plunger to yieldingly confine the plunger therebetween, the spring adjacent the contact end of said plunger including as a part thereof an electrical contact opposing said plunger contact, abutment means carried by the support and engaging the inner opposed surfaces of the springs adjacent the plunger ends to limit inward movement of the springs; two spring adjusters co-acting with intermediate portions of said respective springs to regulate the maximum force with which each spring is urged into engagement with the coacting abutment means, stroboscopic circuit means connected to said respective contacts, and means connected to said coupling sleeve for effecting longitudinal cyclic movement of the latter.

3. A stroboscopic vibratory pickup unit comprising, in combination, an elongated plunger defining an outer cylindrical surface thereon, a coupling sleeve defining an inner cylindrical surface encircling said outer cylindrical plunger surface in closely spaced relation thereto, a viscous fluid forming a film between said cylindrical surfaces to yieldably resist relative longitudinal motion between said sleeve and said plunger, cycling means connected with said sleeve for moving the latter along the axis of said plunger, a stationary support, first and second springs of similar strength characteristics mounted in spaced relation on said support, disposed for engagement with opposite ends of said plunger, and urged toward each other along the axis of the plunger, two stationary abutments mounted on said support and disposed for engagement with the inner opposed surfaces of the springs in immediately adjacent relation to said plunger ends while the springs are in substantially simultaneous engagement with opposite ends of said plunger; and one of said contact elements and the adjacent end of said plunger forming, respectively, two separable stroboscopic electrical contacts.

4. A stroboscopic vibratory pickup unit comprising, in combination, a stationary support member, an annular operating sleeve, structure carrying the sleeve for reciprocable movement relative to the member, a pair of springs secured to the member in spaced relation at either longitudinal end of the sleeve, a stationary abutment structure carried by the member and engaging the inner opposed surfaces of the springs to limit inward movement of the springs toward the sleeve, a plunger reciprocably received within the sleeve with a close fit therebetween, the plunger dimensioned longitudinally to engage the inner surfaces of the springs in positions adjacent the abutment structure when the springs are in engagement with the abutment structure, a pair of electrical contacts carried by one end of the plunger and by the spring which it engages, and a viscous fluid disposed between the juxtaposed plunger and sleeve surfaces for resisting rapid relative movement of the sleeve and plunger.

5. A stroboscopic vibratory pickup unit comprising, in combination, a stationary support member, an annular operating sleeve, structure including a pair of spaced springs secured to the member and to the sleeve for carrying the sleeve for reciprocable movement relative to the member, a second pair of springs secured to the member in spaced relation at either longitudinal end of the sleeve, stationary stops carried by the member and engaging the inner opposed surfaces of the second springs to limit inward movement of the springs toward the sleeve, a plunger reciprocably received within the sleeve with a close fit therebetween, the plunger diminished longitudinally to engage the inner surfaces of the second pair of springs in positions adjacent the abutment structure while the springs are in engagement with the abutment structure, a pair of relatively adjustable electrical contacts defined by one end of the plunger and by the spring which it engages, and a viscous fluid disposed between the juxtaposed plunger and sleeve surfaces for resisting rapid relative movement between the sleeve and plunger.

6. A stroboscopic vibratory pickup unit comprising, in combination, a stationary support member, an annular operating sleeve, structure including a pair of spaced springs secured to the member for carrying the sleeve for reciprocable movement relative to the member, a second pair of springs secured to the member in spaced relation at either longitudinal end of the sleeve, a stationary abutment structure carried by the member and engaging the inner opposed surfaces of the second springs to limit inward movement of the springs toward the sleeve, a plunger reciprocably received within the sleeve with a close fit therebetween, the plunger dimensioned longitudinally to engage the inner surfaces of the second pair of springs in positions adjacent the abutment structure while the springs are in engagement with the abutment structure, a pair of relatively adjustable electrical contacts defined by one end of the plunger and by the spring which it engages, a viscous fluid disposed between the juxtaposed plunger and sleeve surfaces for resisting rapid relative movement between the sleeve and plunger, a pair of annular boots of a resilient material secured to the ends of the plunger and the sleeve for retaining a supply of the viscous fluid therein, a plurality of axially spaced circumferential grooves in the plunger for retaining a substantial volume of the viscous fluid, and means for adjusting the force with which the second pair of springs engage the opposite ends of the plunger.

References Cited in the file of this patent

UNITED STATES PATENTS

| 1,048,670 | Fessenden | Dec. 31, 1912 |
| 2,181,879 | Edgerton | Dec. 5, 1939 |
| 2,478,901 | Edgerton | Aug. 16, 1949 |
| 2,548,809 | Norman | Apr. 10, 1951 |
| 2,656,713 | Allen | Oct. 27, 1953 |